(No Model.)
M. STANSEL.
BELT PROTECTOR AND GUIDE.
No. 342,269. Patented May 18, 1886.
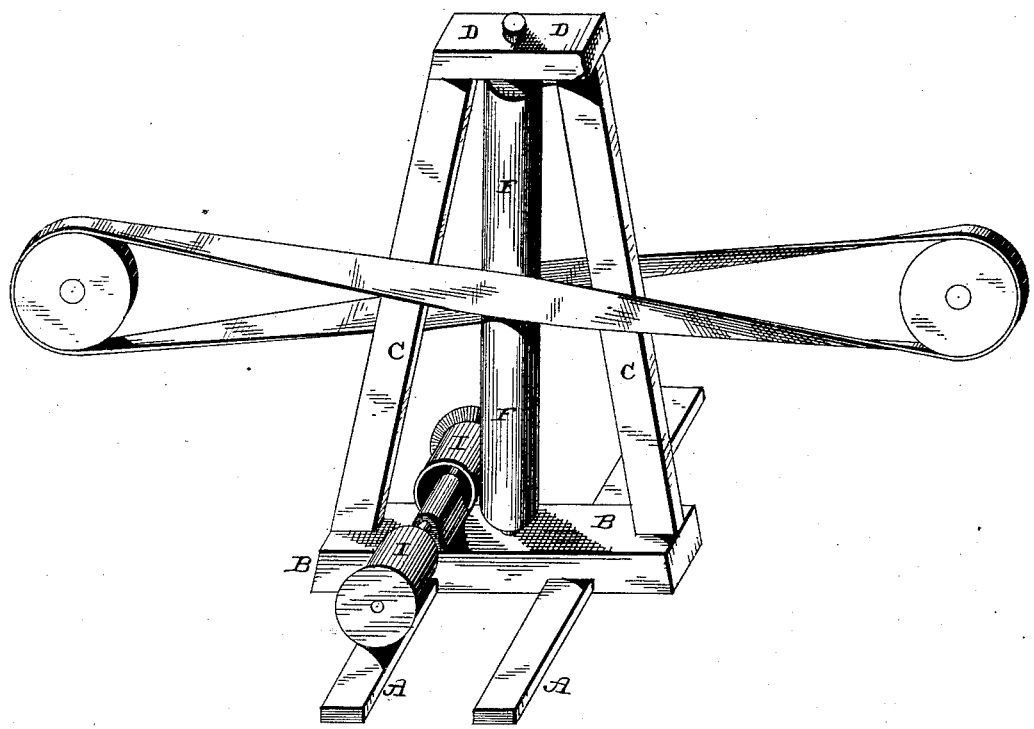
WITNESSES:
R. F. Gardner
A. S. Pattison
INVENTOR.
Mingo Stansel,
BY
F. A. Lehmann,
ATTORNEY.

UNITED STATES PATENT OFFICE.

MENZO STANSEL, OF YORKVILLE, ILLINOIS.

BELT PROTECTOR AND GUIDE.

SPECIFICATION forming part of Letters Patent No. 342,269, dated May 18, 1886.

Application filed January 18, 1886. Serial No. 188,892. (No model.)

*To all whom it may concern:*

Be it known that I, MENZO STANSEL, of Yorkville, in the county of Kendall and State of Illinois, have invented certain new and useful Improvements in Belt Protectors and Guides; and I do hereby declare the following to be a full, clear, and exact description of the invention, such as will enable others skilled in the art to which it pertains to make and use it, reference being had to the accompanying drawing, which forms part of this specification.

My invention relates to an improvement in belt protectors and guides; and it consists in the combination of a suitable upright frame, a vertical roller, which is journaled therein, and two horizontal rollers journaled upon the base of the frame and at right angles to the vertical one, and which horizontal rollers revolve in opposite directions when the belt becomes slack and sinks down upon them, as will be more fully described hereinafter.

The object of my invention is to provide a belt-protector which is to be used where the engine and the machine being driven are placed some distance apart, and where the belt is made to cross so that it will rub together while in operation, and thus not only wear out the belt, but cause a great deal of extra friction.

The accompanying drawing represents a perspective of a belt-protector embodying my invention.

A represents the ground-sills, upon the top of which is placed the beam B, at right angles thereto. Rising from each end of this beam B are the two inclined uprights C, which are united together at their upper ends by means of the top piece, D.

Journaled in suitable boxes upon the bottom piece, B, and the top piece, D, is the vertical roller F, of any suitable length and diameter, and which is placed in between the belt where it crosses, for the purpose of keeping the belt from rubbing together, as it otherwise would. This roller may be made of wood and provided with journals in each end, or it may be made of a pipe and have suitable bearings secured in its ends, or in any other manner that may be preferred. I do not limit myself to any mere details of construction, for this is a mere matter of choice. This roller, being placed in between the belt at that point where it crosses, prevents the inner sides of the belt from coming in contact with each other and wearing away the belt, preventing, also, a great deal of friction.

Journaled upon the piece B, at the base of the vertical roller F, are the two shorter pulleys or rollers, I, which have flanges formed upon their outer ends, and which rollers are free to revolve in opposite directions, so as to accommodate the different movements of the two parts of the belt. When the belt becomes very slack and drops downward upon these vertical rollers, its edges rest upon the tops of these rollers or pulleys, and thus support the belt at this point, instead of allowing it to drop down and wear its edges out by contact with the ground or some other object.

As the frame and its rollers can be moved freely back and forth at will, it can be applied to the belt at any point that may be desired.

By means of a protector as here shown and described there will be no necessity for varying the distance between the machine being driven and the engine during very dry weather, when the belt expands so as to become very slack, for, as the belt becomes slack, it will simply sink upon the lower rollers, upon which it will run without injury until the belt again contracts so as to run in its proper position.

Although the vertical roller, as here shown, is supported by two braces and a cross-piece, it is not absolutely necessary that this construction should be used. If preferred, the vertical roller may be journaled at its lower end only, and thus used without any framework to support its upper end.

Having thus described my invention, I claim—

The combination of the sill B, the vertical roller F, mounted thereon, and the roller or rollers I, placed at the base of the roller F and extending at right angles thereto, substantially as shown.

In testimony whereof I affix my signature in presence of two witnesses.

MENZO STANSEL.

Witnesses:
 AUGUSTUS C. GABEL,
 SAMUEL HAGERMAN.